Jan. 28, 1930.  C. W. OMAN  1,745,312
MULTIPLY VALVE BAG MACHINE
Filed June 1, 1927   11 Sheets-Sheet 1
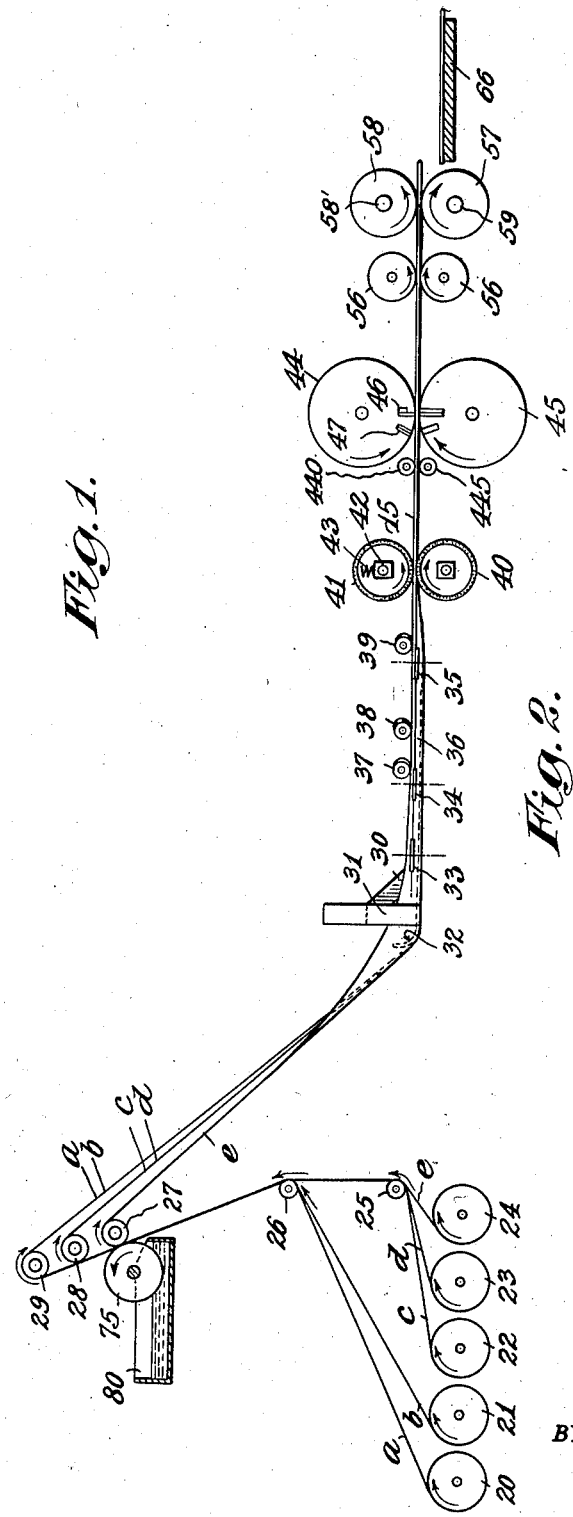
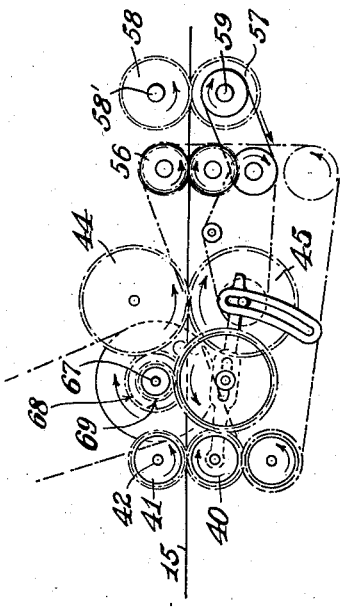
INVENTOR:
Carl W. Oman
BY
ATTORNEYS Jan. 28, 1930. C. W. OMAN 1,745,312
MULTIPLY VALVE BAG MACHINE
Filed June 1, 1927 11 Sheets-Sheet 2
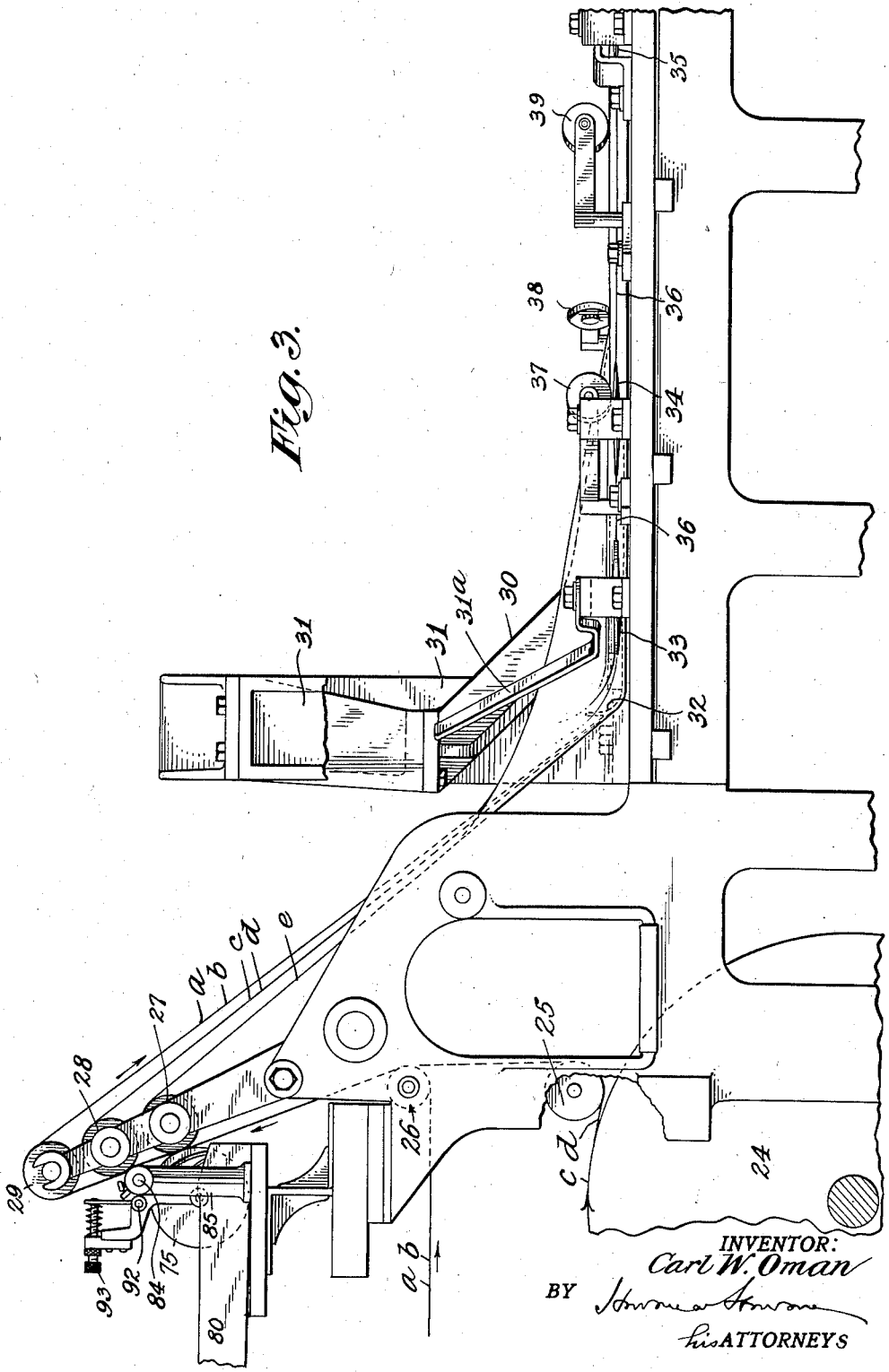
INVENTOR:
Carl W. Oman
BY
his ATTORNEYS

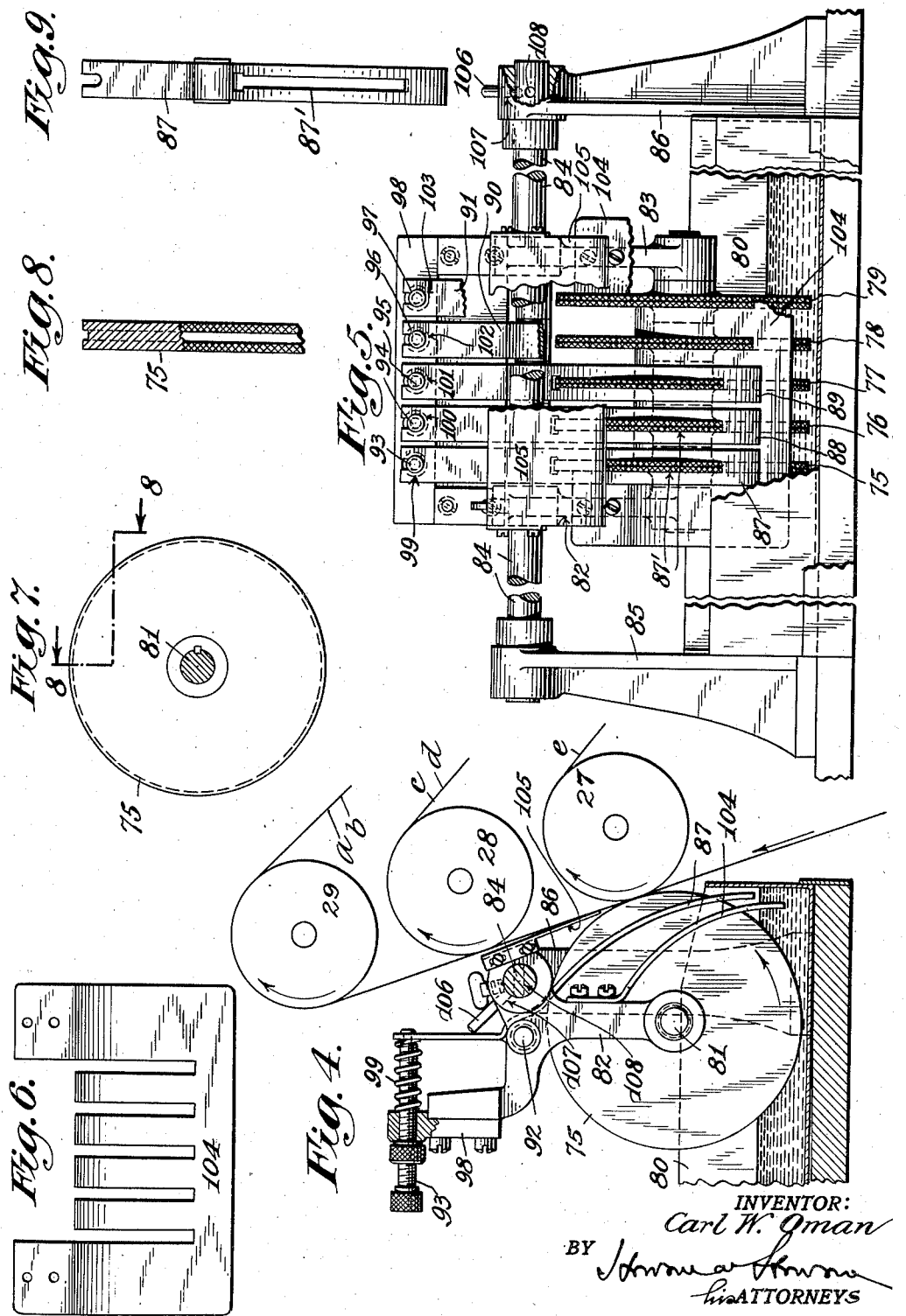

Jan. 28, 1930. C. W. OMAN 1,745,312
MULTIPLY VALVE BAG MACHINE
Filed June 1, 1927   11 Sheets-Sheet 4

INVENTOR:
Carl W. Oman
BY
his ATTORNEYS

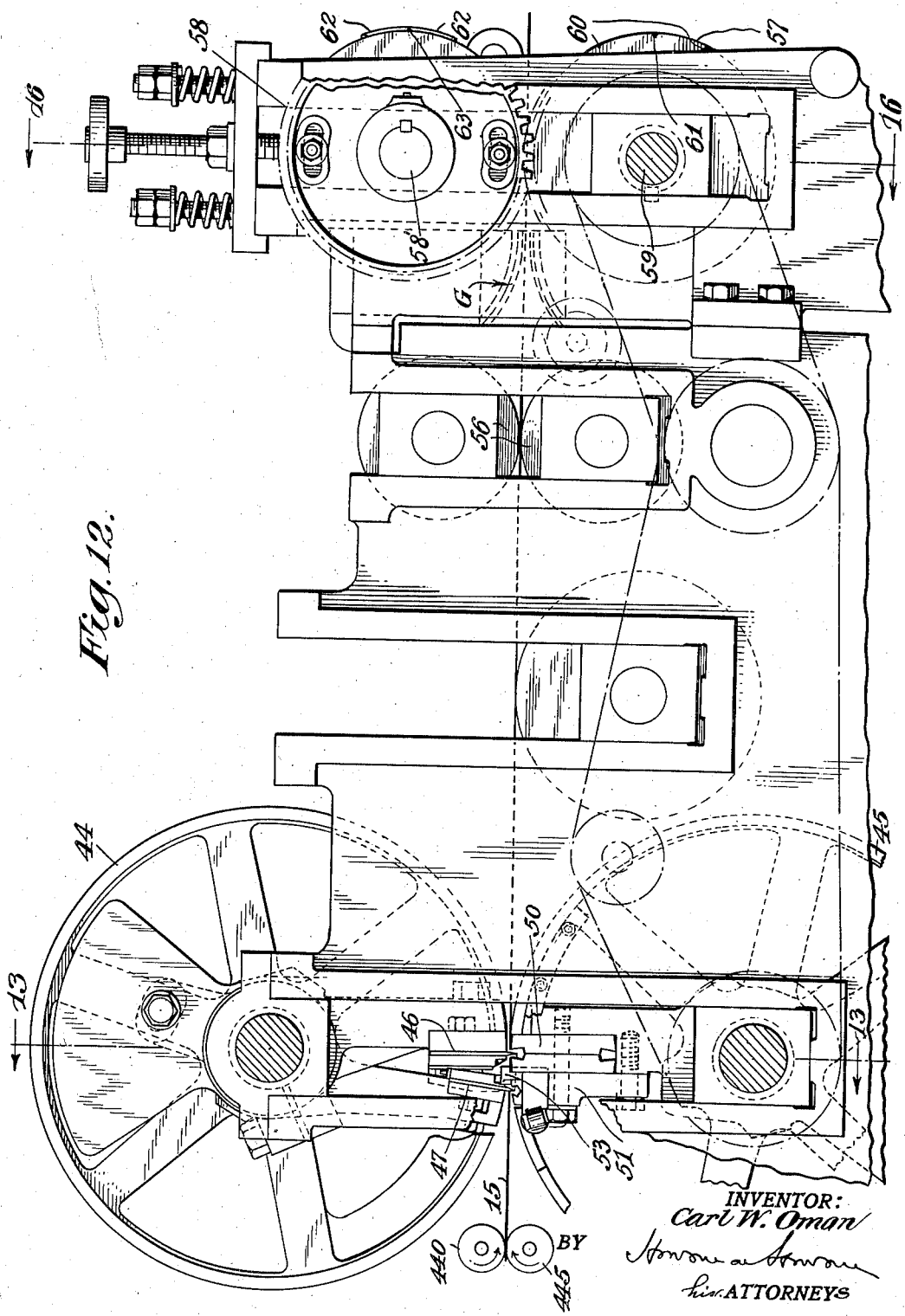

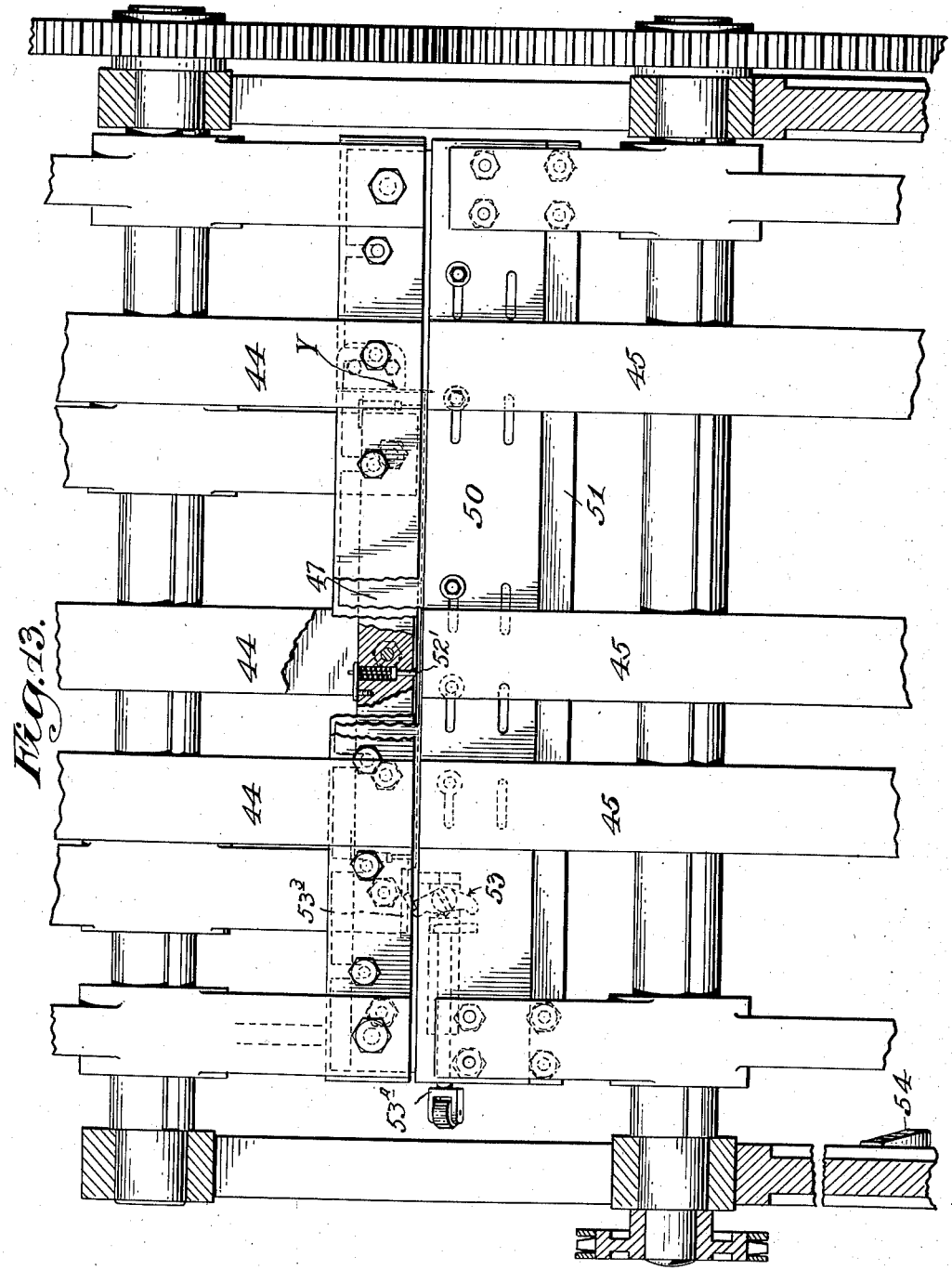

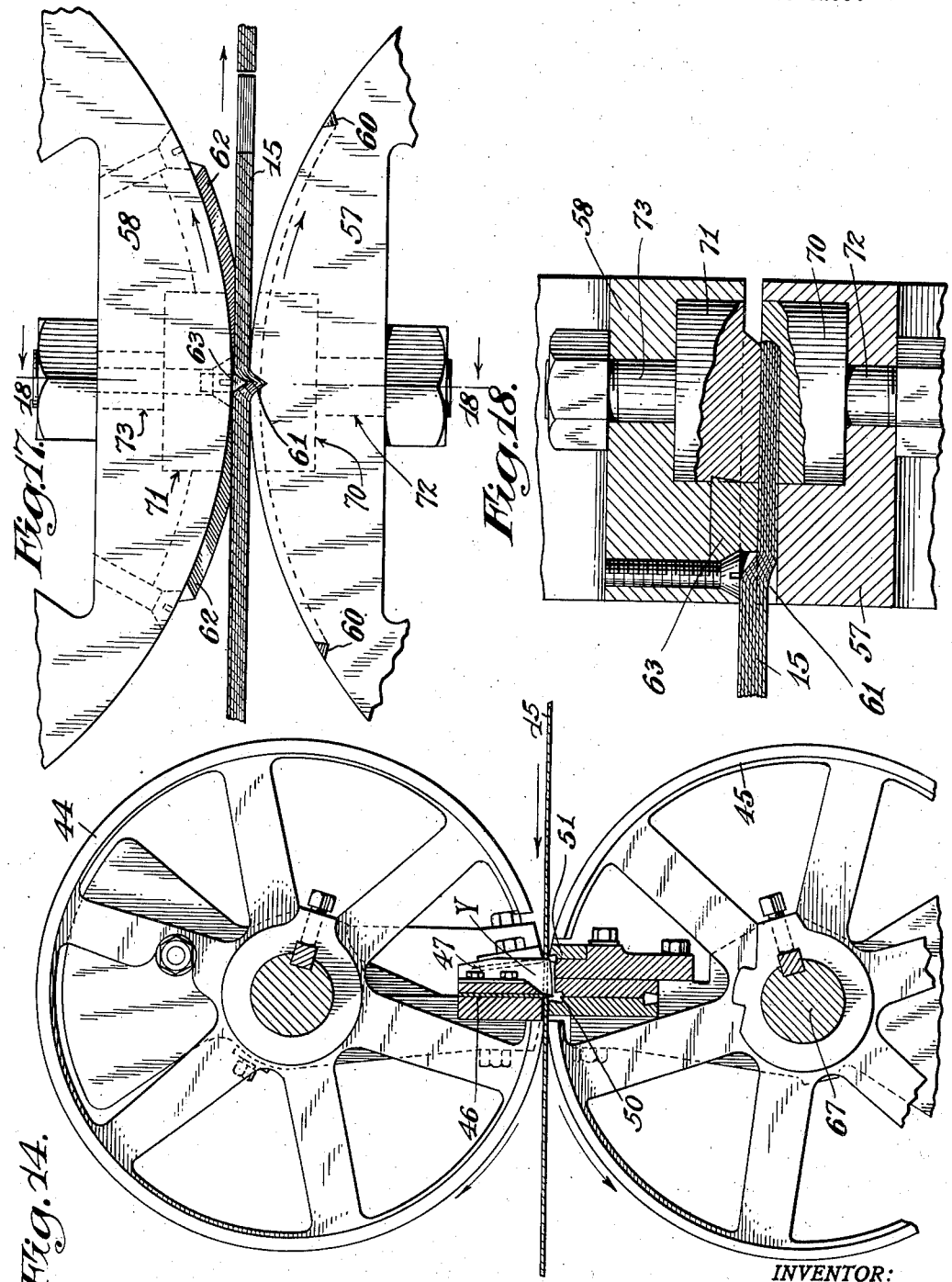

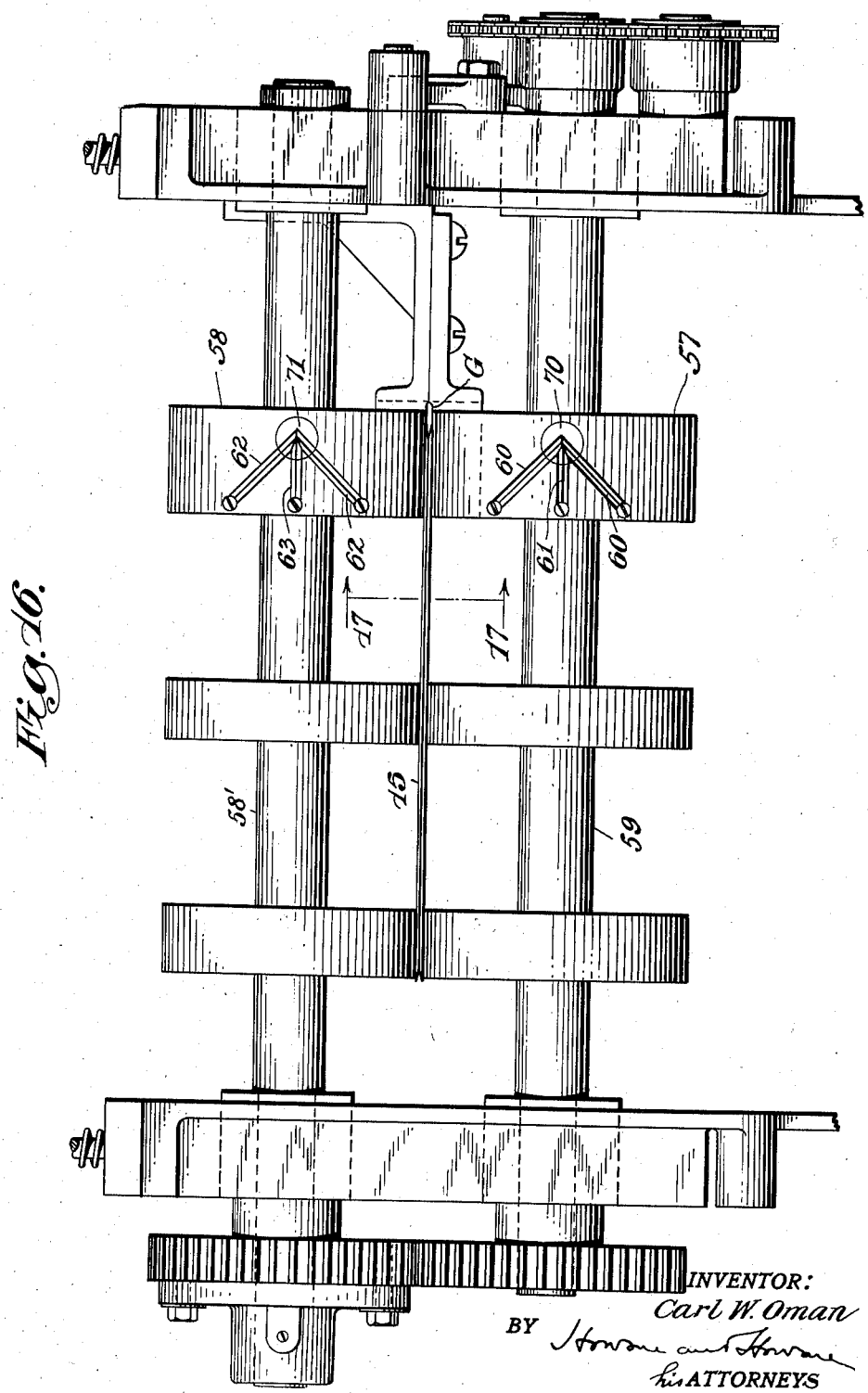

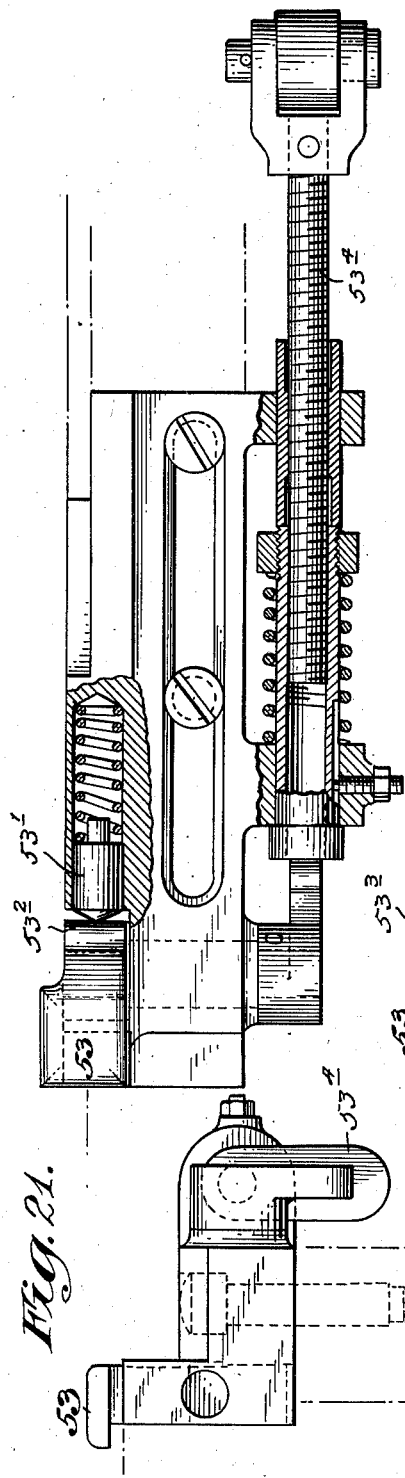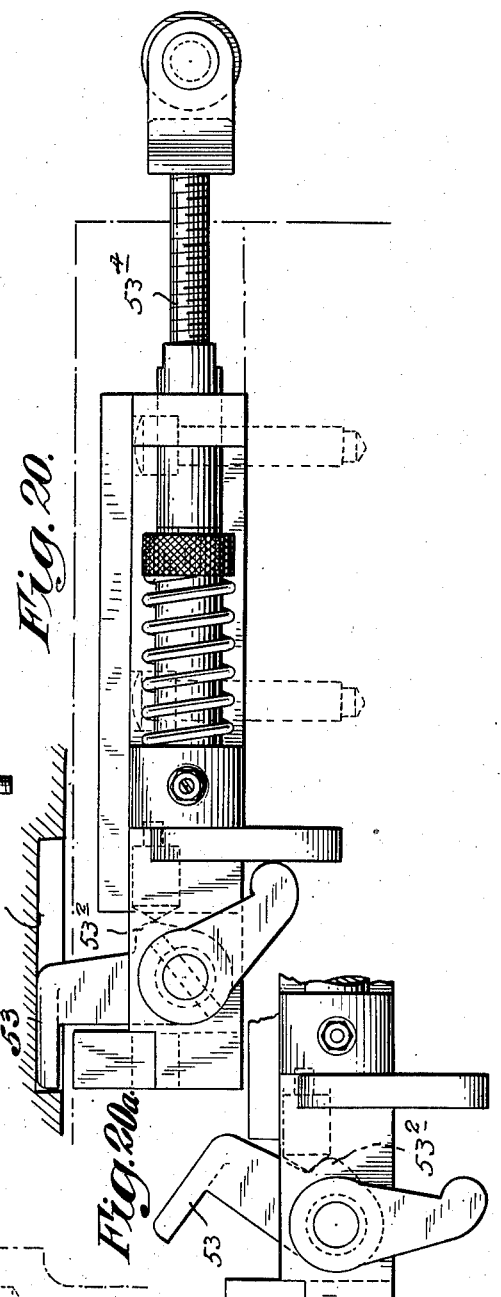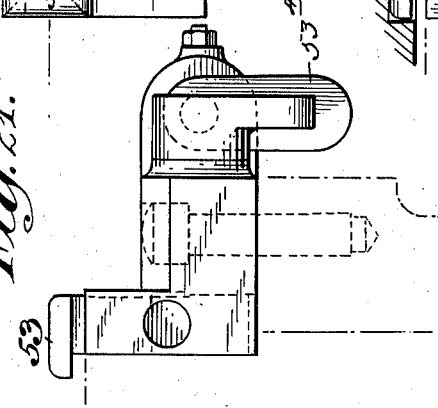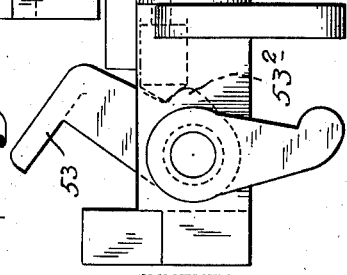

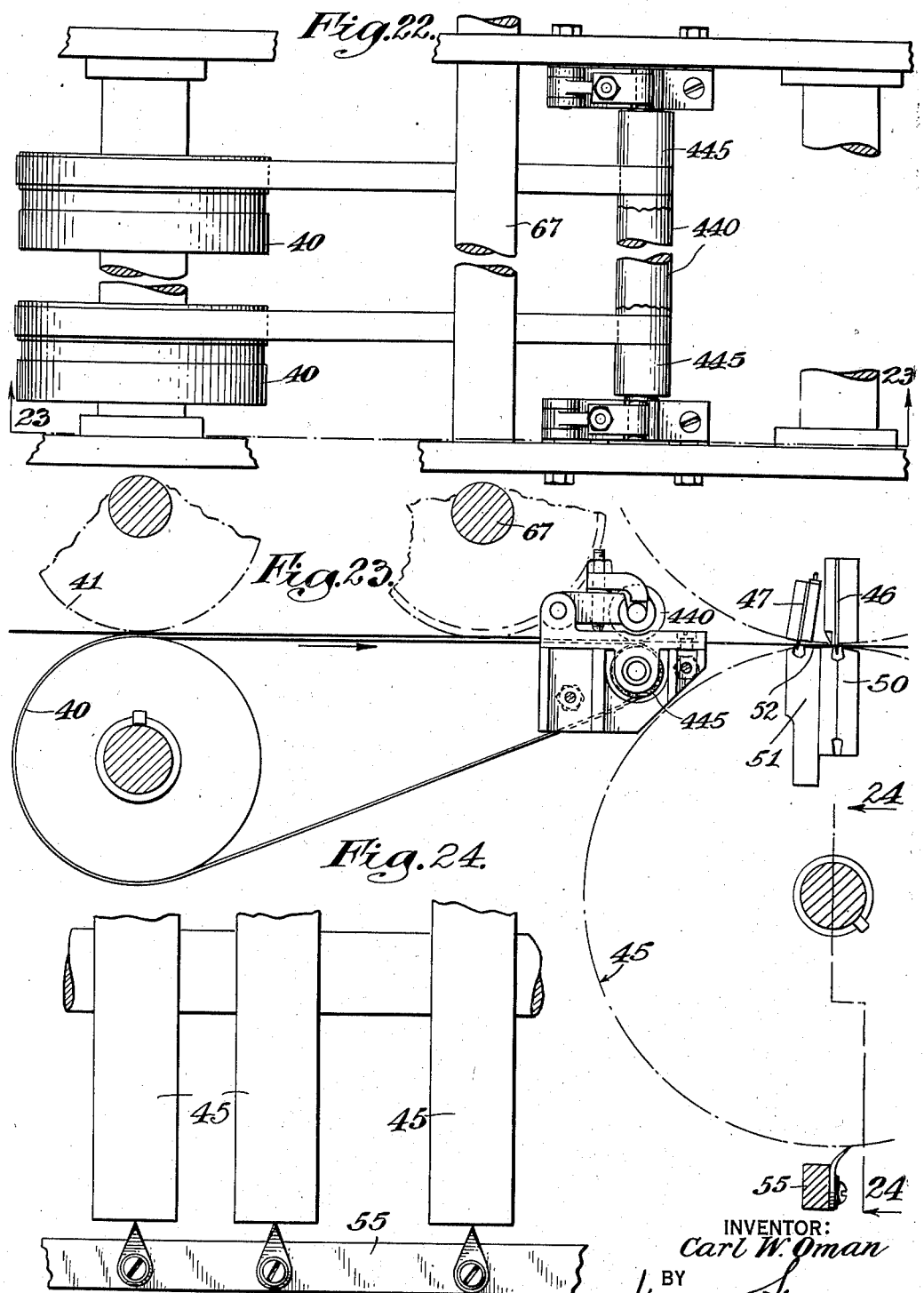

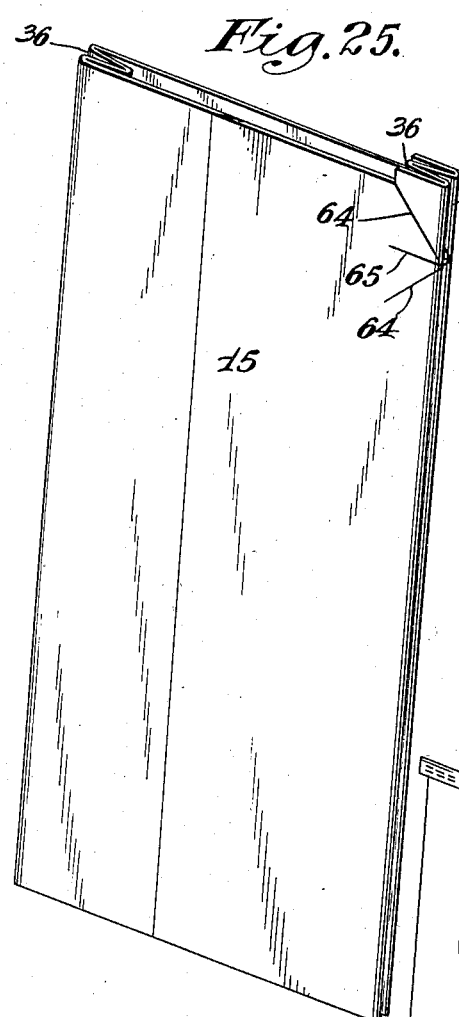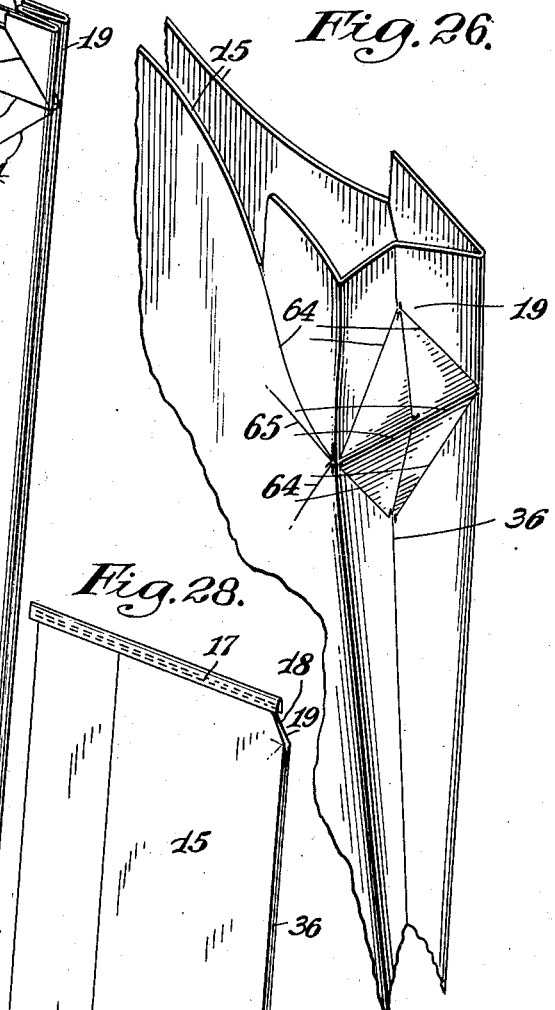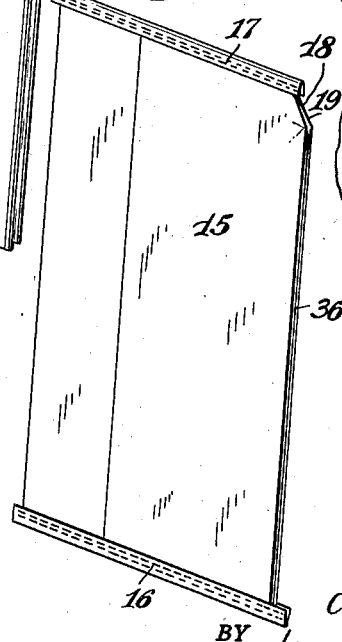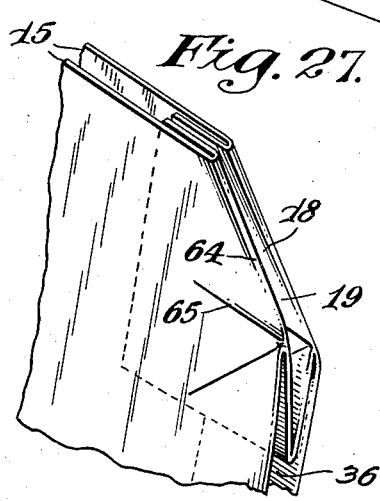

Patented Jan. 28, 1930

1,745,312

UNITED STATES PATENT OFFICE

CARL W. OMAN, OF SOUTH WINDHAM, CONNECTICUT, ASSIGNOR TO THE SMITH & WINCHESTER MFG. CO., OF SOUTH WINDHAM, CONNECTICUT, A CORPORATION OF CONNECTICUT

MULTIPLY-VALVE-BAG MACHINE

Application filed June 1, 1927. Serial No. 195,731.

My invention relates to the manufacture of paper bags, and particularly to bags of the valve type, although certain features of the invention are applicable to bags of other types. The general objects of my invention are—improved method and apparatus for forming a bag tube of single or multi-ply thickness with its valve area appropriately creased to facilitate the in-folding of the valve by hand, or otherwise, preparatory to the sealing of the bag ends, e. g. by cross seams. More specifically my object is to accomplish this in a single machine in which all of the operating parts are rotary, so that the advance of the tube and blanks is uninterrupted. Still more specifically, my invention contemplates in addition to features of general organization, improved construction in detail of paster, cutter and creaser units which cooperate in the production of the bag.

An apparatus embodying my invention in one form is illustrated in the accompanying drawings, in which—

Fig. 1 is a schematic side elevation illustrating the operations of the machine;

Fig. 2 is a schematic side elevation illustrating the drive connections;

Fig. 3 is a broken side elevation illustrating the tube forming end of the machine;

Fig. 4 is a broken side elevation of the paster mechanism to a large scale;

Fig. 5 is a broken front elevation of the latter;

Fig. 6 is a front elevation of one of the scraper devices of the paster;

Fig. 7 is a side elevation of one of the paster discs;

Fig. 8 is a section on the line 8—8, Fig. 7;

Fig. 9 is a front elevation of another of the scraper devices;

Fig. 12 is a broken side elevation of the cutter and creaser mechanisms;

Fig. 13 is a broken transverse section on the line 13—13, Fig. 12, showing the cutter mechanism and cut-out gripper;

Fig. 14 is a broken vertical section through the cutter drums;

Fig. 16 is a front view of the creaser mechanism;

Fig. 17 is a section on the line 17—17, Fig. 16;

Fig. 18 is a section on the line 18—18, Fig. 17;

Fig. 19 is a broken top plan of the cut-out gripper device;

Fig. 20 is a side elevation thereof, closed;

Figure 10:
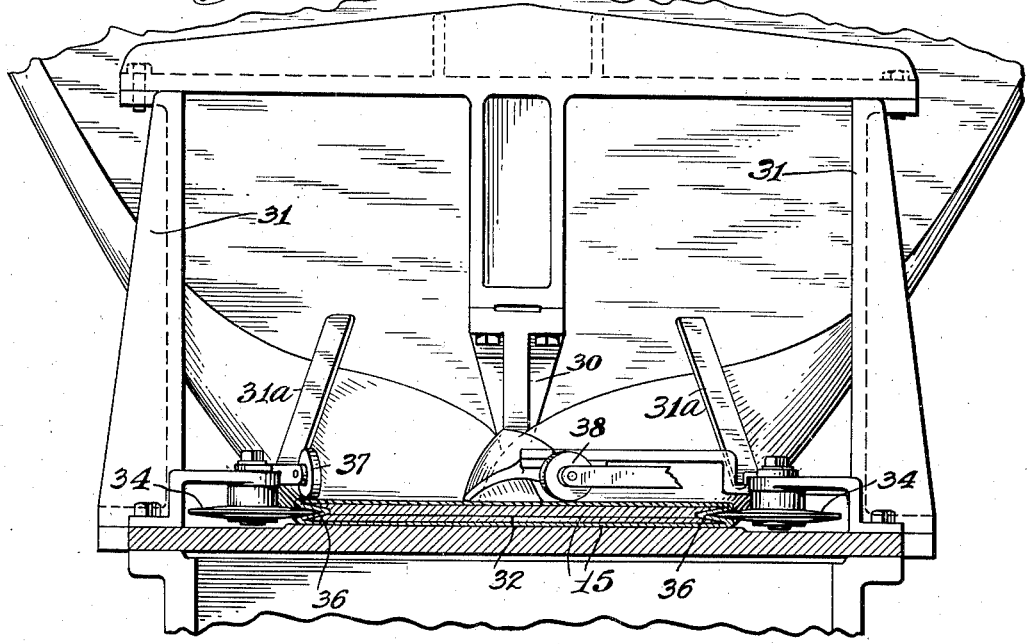
Fig. 10 is a transverse section illustrating the tube former plow, folders and side pleaters.

Fig. 20ª is a side elevation thereof, open;

Fig. 21 is an end elevation thereof;

Fig. 22 is a broken top plan of the drive of the intermediate draw or presser rolls;

Fig. 23 is a section on the line 23—23, Fig. 22;

Fig. 24 is a section on the line 24—24, Fig. 23;

Fig. 25 is a perspective of the tube blank as it leaves the machine;

Fig. 26 is a broken perspective illustrating the in-folding of the valve flap;

Fig. 27 is a broken perspective illustrating the folding-in valve flap; and

Fig. 28 is a perspective of the finished product.

The type of bag to which my invention relates is illustrated in multi-ply form in Fig. 28, and comprises a body tube 15, closed at one end by the sewed cross seam 16, and partially closed by a like seam 17 in its other end. At one corner of the latter, however, a lateral fill opening 18 is afforded by an infolded corner or valve area 19 which, after the bag is filled and inverted, is held by the filled material against the bag walls with which it forms a seal. This article is well known to the trade. The production of the same as heretofore carried out, however, has involved a series of operations performed on different machines and requiring extensive handling and apparatus, which my invention obviates. Thus, it is customary to form the multi-ply paper web into a tube and to wind the tube in a continuous length on a transfer roll. When a sufficient length of tube has accumulated on the roll, the latter is transferred to a second machine, in which the tube is cut into double bag lengths. The double bag lengths are then fed to another cutting machine, where they are divided into single bag lengths. The single bag lengths are then transferred to another cutter, which cuts out a strip leaving the bag flap. The tube is then passed to a tucker, which turns in the valve flap. Finally in still another machine both ends of the tube are cross seamed, thus completing the bag.

Referring to my invention, the tube as continuously formed is cut, without interruption of its advance, into single bag lengths with projecting valve flaps, and the latter creased for in-folding or tucking. The single bag blanks thus formed directly from the web, are delivered to a receiving platform. The tucking-in of the valve flaps may be expeditiously accomplished by hand in view of the creased valve flap area of the thus completed blank; and is then fed at once to the seamer for sewing the end cross seams. Only a single transfer operation is thus necessary, and that may be accomplished by the operative who tucks in the valve flap. Not only is the number of operatives and machines thus greatly reduced, but production itself is speeded up by the practice of my invention.

The sequence of operations and the course of the web and blank-forming machine is readily followed from Fig. 1. Here I have indicated the invention applied to a multi-ply bag comprising five thicknesses of paper.

Five feed rolls 20, 21, 22, 23, 24 deliver the several paper webs $a$, $b$, $c$, $d$, $e$ in transversely stepped relation to the guide rolls 25 and 26, from which the multi-ply web is led upward to the first down-turn guide roll 27. Here the several webs are engaged by the several paster rolls 75, 76, 77, 78 and 79 (see Figs. 4–9) which apply adhesive to the exposed margins of the several webs. Web $e$ is carried downward over roller 27, while webs $c$ and $d$ are carried over another guide roll 28 and webs $a$ and $b$ over still another guide roll 29. Each web might have a separate guide roller if desired, my object in using a plurality of rollers being to prevent the occurrence of slack between the webs in the final tube. Passing the web over a single guide roller, such as 27, results in such slack, by reason of the excessive linear speed of the outermost web as compared to that of the innermost web passing over the roll. No objectionable slack results, however, if two webs are carried over the same roll as at 28 and 29, although it may be entirely eliminated by the use of more guide rolls.

Figure 11:
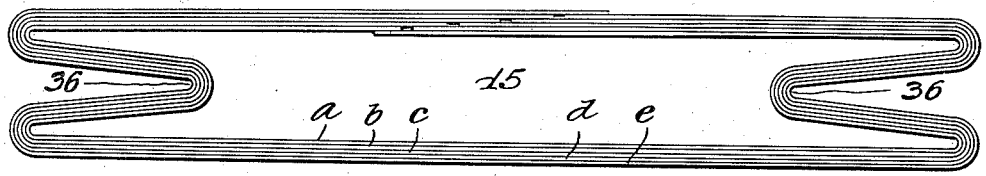
Fig. 11 is an enlarged section through the tube as it leaves the former.

From these guide rolls the multi-ply web passes downward to a plow former 30 supported by standards 31, and over which the side margins of the web are folded by the deflecting arms 31$^a$. A pair of marginally spaced plates 32 is supported by and in extension of the plow 30, and the opposite sides of the now partially formed tube are pressed into the marginal recesses between the plates by idler discs 33, 34, 35, which thus form the pleated sides 36 (Fig. 11) of the tube. Transversely angled idler rolls 37, 38, 39 keep the sides of the upper tube wall taut against the edge of the former plates 32, so that the tube reaches the drawing rolls 40 and 41 substantially flat, with pleated sides.

The drawing rolls 40 and 41 are rubber jacketed and are positively driven in synchronism. They are also stressed against the tubes by spring 43 which thrusts the shaft 42 of roll 41 downward to insure a firm grip of the rolls on the tube. These rolls draw the paper through the machine from the feed rolls 20—24, past the paster, guide rolls and former, and constitute the main impelling force applied to the tube.

Following the main drawing rolls 40 and 41 are rotary cutters 44 and 45, between which the thus completed tube is directly fed. Of these the upper drum 44 carries the knives 46 and 47, while the lower drum 45 carries the cooperating cutter bars. The particular type of rotary cutter may be varied so long as it effects the severing cut which parts the tube across its entire width, and also the longitudinal cut and partial transverse cut to form the valve flap.

Figure 15:
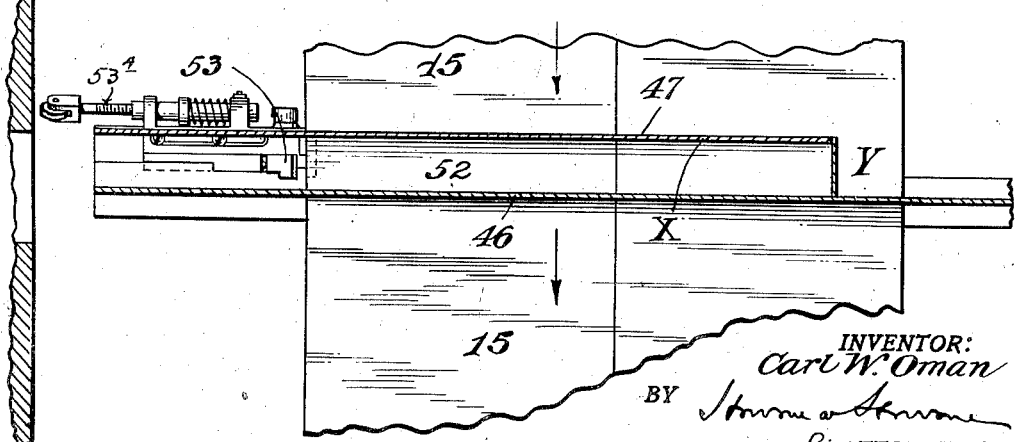
Fig. 15 is a horizontal section through the cutter knives.

I have indicated (see Figs. 12 to 15 inclusive and particularly Fig. 15) the knife 46 as a straight blade for effecting the transverse severing cut for the tube, while the blade 47 has a parallel reach X and a second reach Y normal thereto and extending to the blade 46 to effect the right angle cut desired to form the valve flap. The drum 45 carries the cooperating cutter bars 50 and 51 which are adjustably mounted and appropriately recessed to afford shearing edges for the knives 46 and 47. The adjustable mounting of the cutter bars may be similar to that of the knives, if preferred, to afford greater range of adjustability. Preferably the knives are arranged to come into operation in the sequence 46, 47 so that the first knife to engage the tube completely severs it from the blank which is in advance of the cut.

Note that directly in advance of the cutter drums 44 and 45, and engaging the tube in proximity to the point at which the cutting knives operate on the latter, are positively driven rolls 440 and 445. These rolls (see Figs. 22 and 23) insure the smooth feed of the tube to the nip of the cutting drums. They are of the pressure type and reinforce the grip of the draw rolls 40 and 41 upon the tube at the moment of the cutting operation. The cutting drums are rotated at a higher peripheral speed than the linear speed of the tube through the machine, and the action of the knives is in part a tearing and in part a severing operation. A firm grip upon the tube at the moment of knife operation is therefore important.

The cut-out waste strip 52 outlined by the knives 46 and 47 may be ejected from the space between the knives by a spring actuated bar 52' (Fig. 13). To insure its removal, however, I mount on the lower drum 45 a spring pressed gripper 53 (Figs. 13, 15, 19, 20, 20ª, 21) which is located between the cutter bars 50, 51 and at the side of the drum in position to engage one end of the strip 52. The gripper 53 is held either open or closed by the spring stressed plunger 53', the nose of which engages one or other of the faces of the cam shoulder 53² on the gripper. To engage the strip, the gripper is closed by contact with the surface 53³ on knife drum 44 between the knife blades, (Figs. 12 and 20). A cam 54 on the frame (Fig. 13) operates plunger 53⁴ to open the gripper at the lower reach of its travel, and thus to release the strip which there falls or is stripped away from the drum by the stripper bar 55.

The bag tube with its valve flap at one corner, passes from the cutting drums to rolls 56, which take the tube from the cutters and deliver it past appropriate guides G (see Figs. 12 and 16) to the rotary creasers 57 and 58, which form, in the valve area of the bag, suitable creases to facilitate the in-folding of the bag flap.

The manner of forming these creases is optional within a wide range of variance. I prefer, however, to employ cooperating dies of the rotary type, to avoid interrupting the forward advance of the bag blank, as would be necessary were the creaser dies of reciprocating type. I have consequently shown the creasers (see Figs. 12, 16, 17, 18) as rotary members which are properly timed for cooperation, not only with each other, but with respect to the cutters, to insure their operation upon the valve area of the blank. The lower creaser die 57, which I have indicated as the female die, is mounted on a counterbalanced rotor on shaft 59, and comprises a V-groove 60, and groove 61 bisecting the angle of the V-groove 60. The cooperating male die 58 is mounted on a shaft 58' and is provided with V-ribs 62 and intermediate rib 63 bisecting the angle of the V-rib 62, the ribs registering and cooperating with the V-grooves 60 and 61 of the female die. The dies are so located on the shafts 59 and 58' that the points of the V-groove register with the marginal area of the bag, and their rotation is so timed that the dies coact upon the blank as the valve flap area passes therebetween. As a result of the creaser die action, the blank has formed therein the V-crease 64 (Fig. 25), and the intermediate crease 65, all of the creases extending through the marginal pleat of the bag. The V-crease 64 has one leg extending from a point on the end of the bag to a point on the side of the bag and another leg extending from said point on the side of the bag diagonally away from the said end of the bag. The crease 65 extends from the apex of the V-crease, that is, from the said point on the side of the bag, between the legs of the V-crease and inwardly the full depth of the pleated portion 36.

Passing from the creaser dies the bag is delivered to a table 66, or other support, from which the operatives remove the blanks and pass them to the feed table for the end seamer (not shown). During the transfer of the tube blanks from the table 66, the operative folds-in the valve flap 19 and the corner of the bag in the manner indicated in Figs. 26 and 27. This in-folding of the valve flap on the crease lines is readily and speedily accomplished after little practice, even on a five-ply bag of the type shown.

The final operation of cross seaming the opposite ends of the bags is well understood in the art, and needs no description.

The drive of the apparatus needs no detailed description since various gear, chain, worm, or other drive may be utilized. I have indicated an appropriate layout, however, in Fig. 2, in which the main driving shaft 67 carries a gear 68, from which the cutter drums and creasers are driven. The drive to the draw rolls 40 and 41 may be varied by changing gear 69 arranged on the same shaft 67 to speed up or retard the feed of the paper through the machine, thus to obtain bags of different lengths. The speed of the drive of the cutters and creasers remains constant, however. Inasmuch as the variations in the speed of the travel of the paper through the machine necessitates an adjustment in the spacing of the cutter blades to insure the formation of a suitable valve flap by the cutter knives, regardless of the speed of the web, the carrier of blade 47 is so mounted that it may be adjusted toward and from the carrier of blade 46. On change of spacing of the knives, the angular portion Y of blade 46 is increased or decreased in length, as the case may be. If a complete change of blades is not desired, the angular portion Y of blade 46 may be made as an independent member, different lengths thereof being utilized for the different spacing of the transverse blades 46—47.

For bags of different lengths, it is customary also to vary the width of the bag, and for this purpose the cutters and creasers are mounted for transverse adjustment on their respective shafts in order to insure their proper position with respect to blanks of different widths.

In addition to the general features of construction by which my invention may be carried out, there are several features of detail construction which I regard as improvements of importance. Thus, with respect to the creasers I have found that the point of greatest wear and danger of injury is located in the area at which the several creaser ribs and grooves meet on each of the creaser dies. I therefore form each of the creaser dies with a renewable block 70, 71, respectively, on the face of which are formed the ribs or grooves at the point of the creasing angle. This block may be made of specially hardened alloy, or may be tempered to greater hardness than is needed for the remaining portions of the dies. These blocks are fitted in their respective rotors in any appropriate fashion, for example by means of their stems 72, 73. This greatly facilitates repair in case of injury. It will be borne in mind that at the point at which this portion of the dies acts upon the tube blank, the blank has a thickness of four times the number of the wall plies, since the creasing must be formed not only in the opposite side walls, but also in the lateral pleat. For a five-ply bag therefore, the dies operate upon twenty thicknesses of paper at this point, and are consequently called upon to perform a very heavy duty.

I also desire to call attention to the construction of the paster. The several discs 75 to 79 inclusive are mounted on and keyed to a transverse shaft 81 which is journaled between two brackets 82 and 83, said brackets being pivotally suspended from a transverse shaft 84 mounted in standards 85 and 86 adjustably secured to the main frame on each side of a paste tub 80. The relative positions of the shafts 81 and 84 in the brackets 82 and 83 are such that gravity urges the paster rolls 75 to 79 inclusive toward the roll 27 and the webs a to e, which pass over the latter and there receive paste from the discs. Peripheral scrapers 87 to 91 inclusive are freely mounted on a transverse shaft 92 which is supported in and between brackets 82 and 83, said scrapers being provided with slots 87' slightly greater in width than the paster discs which protrude through the said slots. The upper ends of the scrapers 87 to 91, are bifurcated and engage necks at the ends of adjusting screws 93 to 97 inclusive, which are threaded into a transverse bar 98 secured at each end thereof to the brackets 82 and 83. Springs 99 to 103 take up any lost motion in the engagement between the screws 93—97 and the ends of the scrapers 87 to 91. A second scraper 104 mounted on the brackets 82 and 83 is slotted to accommodate the several discs 75 to 79, its several tongues lying adjacent the side faces thereof to remove excess paste from this area of the paster discs. Carried also by the brackets 82 and 83 and arranged above the point of contact between the discs and the paper webs, is a spreader plate 105 in contact with which the webs with adherent paste travel, and by which the paste, applied in several rather limited lines, is distributed over the lapping exposed margin of each web, thus insuring an extended area of adhesion when the pasted margins are applied to the opposite margins of the multi-ply tubes as they pass through the draw rolls.

During the threading of the paper webs through the rollers 27, 28 and 29, it is convenient to move the paster away from obstructing position. For this purpose it is bodily rockable on the supporting brackets 85 and 86, and any suitable means may be provided to hold it in non-obstructing position. I have shown for this purpose a pin 106 which passes through a hole in the trunnion 107 and takes into hole 108 in the shaft 84 (see Figs. 4 and 5) which carries the paster wheels and scrapers.

It will be obvious that my invention greatly reduces the number of separate operations which have heretofore been customary in the manufacture of bags of the type in question. Cost of production is thus not only reduced, but the speed of production is increased, and it is a feature of advantage that all of the operations performed in the present machine are accomplished by rotary members which operate upon the web, tube and blank as they travel without interruption through the machine.

Various modifications in detail, arrangement and construction will readily occur to those dealing with the problem which do not depart from the thoughts which underlie what I claim as my invention.

I claim:

1. The method of making valve bags, which comprises progressively forming a web into a tube as the web is continuously advanced, severing the continuously advancing tube during its forward travel, into bag lengths with projecting valve flaps, and subjecting the valve area of each bag length to a creasing operation to facilitate in-folding of the valve flap.

2. The method of making valve bags, which comprises progressively forming a web into a tube as the web is continuously advanced, severing the continuously advancing tube during its forward travel, into successive bag lengths with projecting valve flaps, and successively creasing the valve area of each severed bag length as it moves forward after the severing operation.

3. The method of making valve bags which comprises the step of severing a continuously travelling tube into successive bag lengths with projecting valve flaps, and advancing the severed bag lengths while successively creasing their valve areas to facilitate in-folding of the valve flaps.

4. The method of making valve bags which comprises continuously feeding a bag tube to rotary cutting mechanism to form the tube into successive bag lengths with projecting valve flaps during the travel of the bag, and advancing the bag lengths through rotary dies to form folding creases in the valve area of each successive bag during its advance.

5. The method of making a valve bag, which comprises the step of creasing a bag tube in the area of the valve to facilitate the in-folding of the valve flap.

6. The method of making valve bags which comprises advancing a web without interruption through successive tube forming, bag length cutting, and valve-fold creasing operations, halting the advance after the creasing operation, manually in-folding the valve and finally sealing the opposite ends of the bag tube.

7. A bag machine comprising means for forming a web progressively into a tube as the web is advanced, means for cutting the advancing tube into successive single bag lengths, each with a projecting valve flap, and means for forming fold creases in the valve area of each bag as it moves from the cutting mechanism.

8. A bag machine comprising means for drawing a web past pasting and forming devices to transform the web into a pasted tube, together with cutting and creasing devices arranged in the sequence stated and operating on the tube to cut the same into successive bag lengths with end valve flaps and to form folding creases in the valve area of each bag while it is continuously advanced.

9. A bag machine comprising tube-forming means, and a rotary mechanism for cutting the tube into bag lengths as the tube is advanced, said rotary mechanism comprising a transverse knife for severing the tube across its entire width, a second transverse knife parallel to the first knife and extending partially across the width of the tube, and a knife lying in a plane normal to the plane of the transverse knives and extending therebetween.

10. A bag machine comprising tube-forming means, and a rotary mechanism for cutting the tube into bag lengths as the tube is advanced, said rotary mechanism comprising a transverse knife for severing the tube across its entire width, a second transverse knife parallel to the first knife and extending partially across the width of the tube, and a knife lying in a plane normal to the plane of the transverse knives and extending therebetween, together with means for driving said knives at a peripheral speed in excess of the linear speed of the tube.

11. A bag machine comprising tube-forming means, and a rotary mechanism for cutting the tube into bag lengths as the tube is advanced, said rotary mechanism comprising a transverse knife for severing the tube across its entire width, a second transverse knife parallel to the first knife and extending partially across the width of the tube, and a knife lying in a plane normal to the plane of the transverse knives and extending therebetween, together with means to remove from the path of blank travel the portion of the tube cut therefrom by the knives.

12. A bag machine comprising tube-forming means, and a rotary mechanism for cutting the tube into bag lengths as the tube is advanced, said rotary mechanism comprising a transverse knife for severing the tube across its entire width, a second transverse knife parallel to the first knife and extending partially across the width of the tube, and a knife lying in a plane normal to the plane of the transverse knives and extending therebetween, together with a gripper engaging the portion of the tube cut therefrom by the knives to positively remove said portion from the path of travel of the tube.

13. In a bag machine, a creaser device comprising a pair of cooperating rotary dies adapted to engage the side margin of a bag tube to form therein a V-shaped crease, the apex of the crease being located at the side of the tube.

14. In a bag machine, a creaser device comprising a pair of cooperating rotary dies adapted to engage the side margin of a bag tube to form therein a V-shaped crease, and a crease bisecting the V-crease, the apex of the crease being located at the side of the tube.

15. In a bag machine, a creaser comprising a die adapted to form a V-groove in a bag tube, said die comprising a body member and a complementary insert forming the portion of the die at which the sides of the V-groove meet.

16. In a bag machine, a rotary cutting mechanism adapted to cut a tube into bag lengths with end valve flaps as the tube advances, in combination with a rotary creasing mechanism timed with respect to the cutting mechanism to form folding creases in the valve areas of the bags as delivered from the cutting mechanism.

17. The method of making a valve bag which comprises continuously advancing a length of bag tubing and cutting the continuously advancing tube into successive single bag lengths, each with a lateral valve flap projecting from one end of the bag length.

18. The method of making a valve bag which comprises continuously advancing a length of laterally pleated tubing, and cutting the continuously advancing pleated tubing into successive single bag lengths, each with a valve flap in the laterally pleated area of the tube.

19. The method of making valve bags which comprises progressively forming a web into a tube, and severing the tube during its forward travel into successive single bag lengths, each with a lateral valve flap projecting from one end of the bag length.

20. The method of making valve bags which comprises progressively forming a web into a laterally pleated tube, and severing the tube during its forward travel into successive single bag lengths, each with a valve flap projecting from one end of the bag length in the laterally pleated area thereof.

21. A bag machine comprising means for forming a paper web progressively into a tube as the web is advanced, and means for cutting the continuously advancing tube into successive single bag lengths, each with a lateral valve flap projecting from one end of the bag length.

22. A bag machine comprising means for forming a paper web progressively into a laterally pleated tube as the web is advanced, and means for cutting the continuously advancing laterally pleated tube into successive single bag lengths, each with a projecting valve flap in the laterally pleated area of the bag length.

23. A bag machine comprising means for forming a paper web progressively into a tube as the web is advanced, and rotary cutter means for severing the continuously advancing tube into successive single bag lengths, each with a lateral valve flap projecting from one end of the bag length.

24. A bag machine comprising means for continuously advancing a length of bag tubing, and means for cutting the continuously advancing tubing into successive single bag lengths, each with a lateral valve flap projecting from one end of the bag length.

25. A bag machine comprising means for continuously advancing a length of laterally pleated bag tubing, and means for cutting the continuously advancing tubing into successive single bag lengths, each with a projecting valve flap in the laterally-pleated area of the bag length.

26. A bag machine comprising means for forming paper webs progressively into a multi-ply tube as the webs are advanced, and means for cutting the continuously advancing multi-ply tube into successive single bag lengths, each with a lateral valve flap projecting from one end of the multi-ply bag length.

27. A bag machine comprising means for forming paper webs progressively into a multi-ply, laterally-pleated tube as the webs are advanced, and means for cutting the continuously advancing multi-ply, laterally-pleated tube into successive single bag lengths, each with a lateral valve flap projecting from one end of the bag length.

28. In the making of a valve bag having a pleated side, the method of preparing the bag for folding to form the valve which comprises the formation of a V crease in the area of the valve with the apex of the crease at the side of the bag and one leg thereof extending diagonally toward the end of the bag.

29. In the making of a valve bag having a pleated side, the method of preparing the bag for folding to form the valve which comprises the formation of a V crease in the area of the valve with the apex of the crease at the side of the bag and one leg thereof extending diagonally toward the end of the bag and the other leg thereof extending diagonally away from the said end of the bag.

30. In the making of a valve bag having a pleated side, the method of preparing the bag for folding to form the valve which comprises the formation of a V crease in the area of the valve with the apex of the crease at the side of the bag and one leg thereof extending diagonally toward the end of the bag, the other leg thereof extending diagonally away from the said end of the bag, and another crease extending from the apex of the V crease between the legs thereof.

31. In the making of a valve bag having a pleated side, the method of preparing the bag for folding to form the valve which comprises the formation of a diagonal crease from a point on the end to a point on the side edge of the bag, the crease being in the material forming the flat sides of the bag, and the formation, in the material forming the pleated side, of a crease extending from said point on the side edge diagonally inward the full depth of the pleated portion and in a direction away from the said end of the bag, and another crease extending from said point on the side edge inward within the angle defined by said diagonal creases and extending the full depth of the pleated portion.

In testimony whereof I have signed my name to this specification.

CARL W. OMAN.

DISCLAIMER 1,745,312.—*Carl W. Oman*, South Windham, Conn. MULTIPLY-VALVE-BAG MACHINE. Patent dated January 28, 1930. Disclaimer filed October 22, 1935, by the assignee, *The Smith & Winchester Manufacturing Co.*

Hereby enters this disclaimer to claims 17 to 27 inclusive, of the aforesaid Letters Patent which are in the following words:

"17. The method of making a valve bag which comprises continuously advancing a length of bag tubing and cutting the continuously advancing tube into successive single bag lengths, each with a lateral valve flap projecting from one end of the bag length.

"18. The method of making a valve bag which comprises continuously advancing a length of laterally pleated tubing, and cutting the continuously advancing pleated tubing into successive single bag lengths, each with a valve flap in the laterally pleated area of the tube.

"19. The method of making valve bags which comprises progressively forming a web into a tube, and severing the tube during its forward travel into successive single bag lengths, each with a lateral valve flap projecting from one end of the bag length.

"20. The method of making valve bags which comprises progressively forming a web into a laterally pleated tube, and severing the tube during its forward travel into successive single bag lengths, each with a valve flap projecting from one end of the bag length in the laterally pleated area thereof.

"21. A bag machine comprising means for forming a paper web progressively into a tube as the web is advanced, and means for cutting the continuously advancing tube into successive single bag lengths, each with a lateral valve flap projecting from one end of the bag length.

"22. A bag machine comprising means for forming a paper web progressively into a laterally pleated tube as the web is advanced, and means for cutting the continuously advancing laterally pleated tube into successive single bag lengths, each with a projecting valve flap in the laterally pleated area of the bag length.

"23. A bag machine comprising means for forming a paper web progressively into a tube as the web is advanced, and rotary cutter means for severing the continuously advancing tube into successive single bag lengths, each with a lateral valve flap projecting from one end of the bag length.

"24. A bag machine comprising means for continuously advancing a length of bag tubing, and means for cutting the continuously advancing tubing into successive single bag lengths, each with a lateral valve flap projecting from one end of the bag length.

"25. A bag machine comprising means for continuously advancing a length of laterally pleated bag tubing, and means for cutting the continuously advancing tubing into successive single bag lengths, each with a projecting valve flap in the laterally-pleated area of the bag length.

"26. A bag machine comprising means for forming paper webs progressively into a multi-ply tube as the webs are advanced, and means for cutting the continuously advancing multi-ply tube into successive single bag lengths, each with a lateral valve flap projecting from one end of the multi-ply bag length.

"27. A bag machine comprising means for forming paper webs progressively into a multi-ply, laterally-pleated tube as the webs are advanced, and means for cutting the continuously advancing multi-ply, laterally-pleated tube into successive single bag lengths, each with a lateral valve flap projecting from one end of the bag length."

[*Official Gazette November 19, 1935.*]